(No Model.) 2 Sheets—Sheet 1.
H. H. KRYGER.
APPARATUS FOR CLEARING RAILWAY TRACKS.
No. 426,129. Patented Apr. 22, 1890.
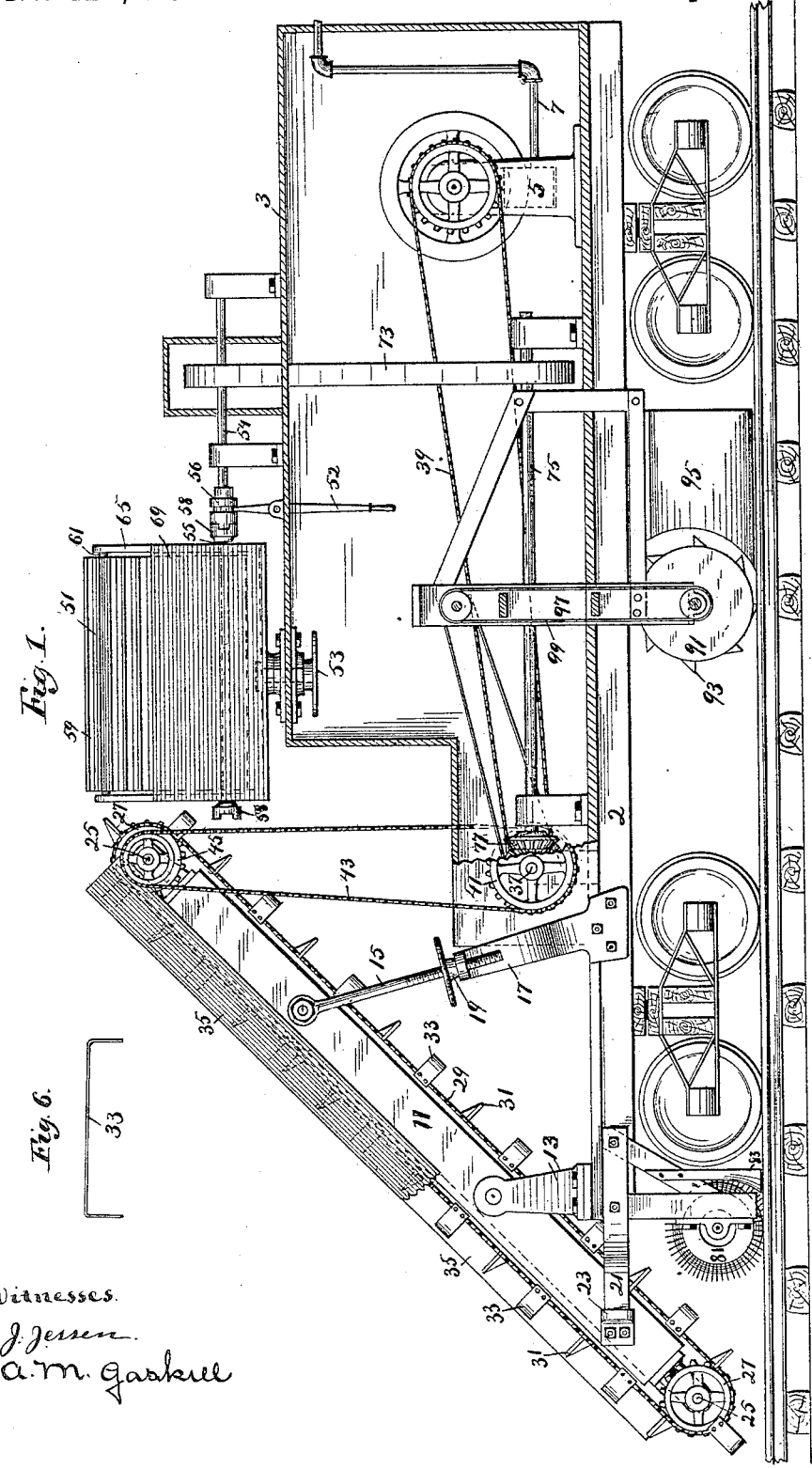
Witnesses:
J. Jessen
A. M. Gaskell
Inventor
Henry H. Kryger
By Paul & Merwin
Att'ys

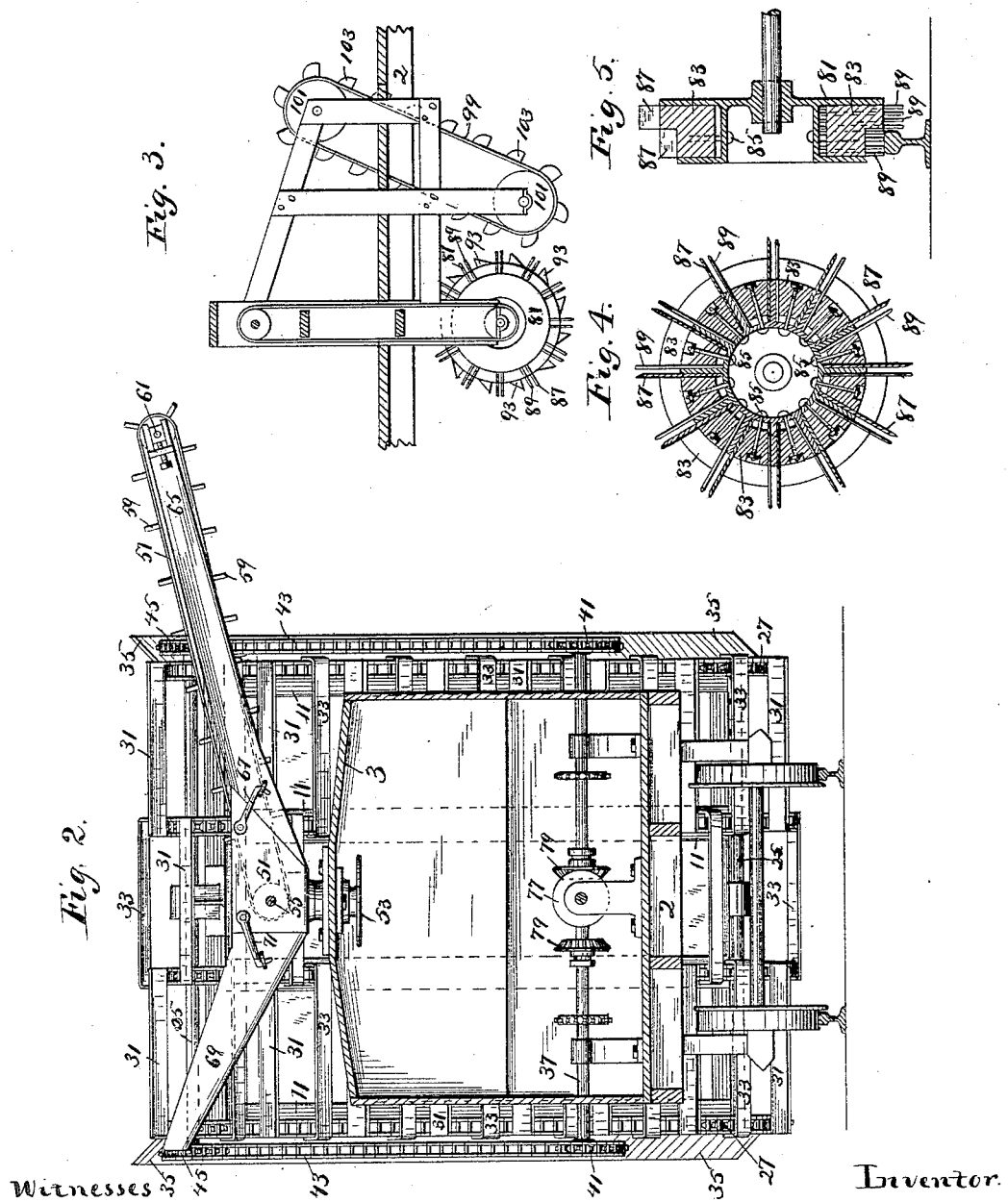

UNITED STATES PATENT OFFICE.

HENRY H. KRYGER, OF MINNEAPOLIS, MINNESOTA, ASSIGNOR OF ONE-HALF TO THOMAS J. CANNEY, OF SAME PLACE.

APPARATUS FOR CLEARING RAILWAY-TRACKS.

SPECIFICATION forming part of Letters Patent No. 426,129, dated April 22, 1890.

Application filed January 28, 1889. Serial No. 297,874. (No model.)

*To all whom it may concern:*

Be it known that I, HENRY H. KRYGER, of Minneapolis, in the county of Hennepin and State of Minnesota, have invented certain Improvements in Apparatus for Clearing Railway-Tracks, of which the following is a specification.

The object of this invention is to provide an improved apparatus for removing snow from railway-tracks and depositing it at the side of the tracks, and at the same time clearing out the spaces between the rails and cleaning the tops of the rails.

The invention consists, generally, in the construction and combination hereinafter described, and particularly pointed out in the claims.

In the accompanying drawings, forming part of this specification, Figure 1 is a sectional side elevation of my improved apparatus. Fig. 2 is a transverse vertical section of the same. Figs. 3, 4, and 5 are details. Fig. 6 is a detail of one of the knives.

In the drawings, 2 represents a suitable car upon which the apparatus is mounted. The forward part of this car is preferably open, while upon the rear part is a suitable structure 3 of substantially the height and width of the superstructure of an ordinary freight-car. A suitable engine 5 is preferably arranged within the structure 3, and is adapted to receive steam through a pipe 7 from the locomotive.

At the forward end of the car I arrange an elevator-frame 11, which is preferably pivoted in standards 13, secured to the forward end of the car. Adjustable brace-rods 15 are pivoted to the upper portion of the elevator-frame, and their lower ends pass through openings in standards 17. These standards are preferably arranged one upon each side of the car. The lower ends of the rods 15 are screw-threaded, and are provided with nuts 19, which rest upon the tops of the standards 17. The nut 19 may be provided with a hand-wheel for convenience in operating. A bar 21 is preferably arranged to project horizontally from the forward ends of the car, and a recessed lug 23 is arranged upon the side of the elevator-frame, so as to engage the bar 21. The elevator-frame is provided at each end with a driving-shaft 25, and each of these shafts is preferably provided with four sprocket-wheels 27. A series of sprocket-chains 29 pass over these sprocket-wheels, and to these chains are secured a series of carriers 31 and a series of knives 33. The knives 33 preferably consist of flat strips of metal having their ends bent at right angles to the main portion of the strip, as shown in detail in Fig. 6. The ends of the strip are secured to the sprocket-chains, and an open space is thus left between the main portion of the knife and the chains. The carriers 31 consist of plates which are secured to the chains and project at right angles therefrom. The elevator-frame is provided with suitable closed bottom and with side boards 35, so that the snow which is taken up by the carriers 31 is moved upward over the elevator-frame and discharged at the top.

Where four chains are used upon the elevator, as shown in Fig. 2, there will be three series of knives and three series of carriers. I prefer to alternate the cutters and carriers, as shown in Fig. 1, and I also prefer to arrange the cutters and carriers of the middle series opposite the spaces between the cutters and carriers of the two outer series, as shown in Fig. 2.

A driving-shaft 37 is mounted on bearings upon the car 2, and is preferably driven by a chain 39 from the engine. The shaft 37 is provided with sprocket-wheels 41 at its ends, and chains 43 extend from these sprocket-wheels to sprocket-wheels 45 upon the shaft 25 at the top of the elevator. By this means the elevator will be driven at any desired rate of speed. Upon the top of the structure 3, I arrange a carrier that is adapted to receive material from the elevator and deliver it upon either side of the track at a sufficient distance therefrom to prevent its interfering with use of the track.

A frame 51 is pivotally mounted upon a suitable support upon the top of the structure 3, and a hand-wheel 53 is arranged within the structure 3, by means of which the frame 51 may be turned upon its pivot from the inside of this structure. A shaft 55 is mounted in the frame 51, and one end of the carrier-belt 57, provided with carriers 59, passes around this shaft. The other end of the carrier passes around the shaft 61 and is arranged in the end of the extension-frame 65. The opposite end of the frame 65 fits against the end of the frame 51, and the two frames are secured together, preferably, by a hook 67. The frame 65 may be of any suitable length, and the carrier may be of any suitable length, so that the snow may be delivered at any desired distance beyond the track.

An inclined frame 69 is secured, preferably by hooks 71, to the opposite side of the frame 51. The top of this frame is closed, and the snow which falls upon it from the elevator slides onto the carrier 57. The shaft 55 is preferably provided with a half-clutch 58 at each end. A shaft 54 is arranged upon the top of the structure 3, and is provided with a half-clutch 56, which is adapted to engage the half-clutch upon either end of the shaft 55. A lever 52 is connected with the clutch 56 and extends upon the inside of the structure 3. The shaft 54 is preferably driven by a belt 73 from a counter-shaft 75, that is driven by bevel-gears 77 and 79 upon the shaft 37. Two sets of gears 79 are arranged upon the shaft 37, and either one may be made to engage the gear 77, so that the shaft 54 may be driven in either direction, as may be necessary to deliver the snow to one or the other side of the track. The carrier may by this means be turned to either side of the track; or when the device is not in use it may be turned to extend along the top of the car. The frame 69 may be removed, and the frame 65 may be dropped down, so as to rest upon the top of the structure 3.

For the purpose of cleaning the tops of the rails and cleaning out a channel just inside of the rail to receive the flanges of the car-wheels, I prefer to arrange a brush or cutter wheel at each side of the car. This wheel 81 will preferably be located at the forward end of the car, as shown in Fig. 1. A small plow 83 may, if preferred, be arranged immediately in the rear of the wheel 81. The wheel 81 has a series of brushes or cutters which operate to clear the snow or ice from the top of the rail, and another series which cut a channel just inside of the rail to receive the flanges of the wheels. The construction of wheel which I prefer to use is shown in Fig. 5. As here shown, the body of the wheel is provided with an open center and with a series of segmental recesses, into which segmental blocks 83 are fitted. These blocks are held in place by means of bolts 85. Cutters 87, having one portion adapted to come close to the top of the rail and a longer portion adapted to extend into the space inside of the rail, are secured in position by the blocks 83. I may also secure by the same means wires 89, some of which act upon the top of the rail and the others extend into the space inside of the rail, as shown in Fig. 5. For the purpose of clearing out the spaces between the rails, I prefer to use a cylinder 91, provided with a series of cutters 93 and arranged in front of a plow 95. The cylinder 91 and plow 95 are supported upon a vertically-movable frame 97, and the cylinder is rotated by means of a suitable belt 99.

The construction and arrangement of the cylinder 91 and plow 95 are not claimed herein, as I have claimed the same in a separate application for patent filed December 31, 1888, Serial No. 295,072.

Instead of arranging the brush and cutter wheels 81 on an independent shaft located at the forward end of the car, I may arrange them upon the shaft of the cutter-cylinder 91, as shown in Fig. 3, and where it is desired to load the snow or ice removed from the spaces between the rails by the cutter-cylinder 91 upon a car I may substitute for the plow 95 a suitable elevator 99, arranged upon pulleys 101 and provided with carriers 103, as shown in Fig. 3.

I claim as my invention—

1. The combination, with a suitable car, of an elevator-frame pivotally supported upon the forward end of said car and provided with a suitable closed bottom and with side boards 35, an elevator arranged upon said frame and consisting of endless belts or chains, with a series of U-shaped cutters 33, having their ends secured to the chains, and a series of carriers 31, consisting of plates projecting from said chains and arranged between said cutters, substantially as described.

2. The combination, with a suitable car, of an inclined elevator mounted upon the forward end of said car, and a transverse carrier pivotally supported upon said car at the upper end of said elevator, a driving-shaft arranged to engage the elevator-shaft at either side of the elevator, and a hand-wheel arranged within the car for turning said elevator upon its pivot, substantially as described.

3. The combination, with a suitable car, of the standards 13, mounted upon the forward end of said car, the inclined elevator pivoted upon said standards, the standards 17, arranged upon said car, the threaded rods 15, secured to said elevator-frame, the adjusting-nut 19, arranged upon said rod, and the pivoted elevator arranged beneath the upper end of said inclined elevator and provided with a hand-wheel by which it may be turned to carry the snow to either side of the track, substantially as described.

4. The combination, with the car and the inclined elevator, of the pivoted frame 51, the frame 65, secured thereto, the carrier 57, and the removable inclined frame 69, all substantially as described.

5. The combination, with the car, of the wheel 81, provided with a central recess and the series of segmental blocks 83, the cutters 87, and the wires 89, secured to said wheel by said blocks, substantially as described.

In testimony whereof I have hereunto set my hand this 24th day of January, 1889.

HENRY H. KRYGER.

In presence of—
A. C. PAUL,
A. M. GASKILL.